United States Patent

[11] 3,575,645

[72] Inventors Kenneth W. Doversberger Kokomo; Thomas J. Furnival, Logansport, Ind.
[21] Appl. No. 842,516
[22] Filed July 17, 1969
[45] Patented Apr. 20, 1971
[73] Assignee General Motors Corporation Detroit, Mich.

[54] POWER ZENER PACKAGE
6 Claims, 14 Drawing Figs.

[52] U.S. Cl. ........ 317/234, 317/235, 317/33, 317/40, 337/1, 337/2, 337/3, 307/116, 307/117
[51] Int. Cl. ........ H01l 1/12, H01l 1/14
[50] Field of Search ........ 317/234, 235, 4, 4.1, 5, 5.4, 33, 40; 307/116, 117; 337/1, 2, 3, 95, 96, 107, 377; 29/573, 585; 313/151

[56] References Cited

UNITED STATES PATENTS

| | | | |
|---|---|---|---|
| 1,738,113 | 12/1929 | Ogden | 317/234 |
| 3,226,603 | 12/1965 | Finn, Jr. et al. | 317/234X |
| 3,386,007 | 5/1968 | Hutchinson | 317/40 |
| 3,401,317 | 9/1968 | Gault | 317/234 |
| 3,404,243 | 10/1968 | Krieger et al. | 179/110 |

*Primary Examiner*—John W. Huckert
*Assistant Examiner*—R. F. Polissack
*Attorneys*—Jean L. Carpenter and Paul Fitzpatrick ABSTRACT: A self-protective circuit element including a semiconductor device and a switch responsive to the semiconductor device temperature and to current through the semiconductor device in a casing. The switch provides an open circuit in series with the semiconductor device when it senses that the semiconductor device temperature is above a certain level or when current through the semiconductor device exceeds a predetermined level. The casing presents the circuit element as an integral unit and provides a plurality of electrically insulated current paths to the switch and the semiconductor device from outside the casing.

A second embodiment provides a self-protective circuit element having an SCR and a temperature responsive switch in series with the gate terminal of the SCR, the switch being responsive to the SCR temperature within a casing.

INVENTORS
Kenneth W. Dovarsberger &
BY Thomas J. Furnival
Paul Fitzpatrick
ATTORNEY INVENTORS
Kenneth W. Doversberger, &
BY Thomas J. Furnival
Paul Fitzpatrick
ATTORNEY INVENTORS
Kenneth W. Oversberger, &
Thomas J. Furnival
BY Paul Fitzpatrick
ATTORNEY

POWER ZENER PACKAGE

This invention relates to self-protective circuit elements.

The use of various semiconductor devices has become widespread in the electronics industry. However, semiconductor devices are very easily destroyed by excessive heat. While heat in the device may be caused by many factors such as ambient temperature, it is primarily due to the passage of currents therethrough.

It is, of course, customary to design electronic circuits so as to never exceed the current or voltage ratings recommended by the manufacturer of a given device, but unavoidable voltage transients and circuit malfunctions frequently apply excessive voltages across the device. These voltages produce excessive currents in the device and frequently result in permanent damage to it. To offset this problem it is customary to place fuses or circuit breakers in series circuit with these devices. By properly matching the fuse or circuit breaker characteristics to those of the device being protected the circuit is opened when current through the fuse or circuit breaker exceeds a certain level, which level is less than the smallest current which will permanently damage the semiconductor device. Protecting semiconductor devices in this fashion has inherent disadvantages. For example, a fuse is designed to be permanently damaged by its first use, necessitating a replacement of the fuse after every use. In addition, both fuses and circuit breakers are produced having standard values, necessitating a selection process in which the optimum performance of the semiconductor device may be partially sacrificed to secure a necessary degree of protection. Another disadvantage of such applications is the need for having separate terminals and connections for both the fuse and the semiconductor device, causing a loss of efficiency in both manufacturing steps required and space requirements of the final product. In addition, prior art attempts to protect semiconductor devices from excessive temperatures have been directed toward sensing temperatures other than the temperature of the semiconductor devices themselves and complicated control circuitry has usually been employed to disconnect the semiconductor devices from their sources of energization.

It is therefore an object of this invention to provide a self-protective circuit element that includes a semiconductor device and a self-resetting temperature responsive switch in a casing that presents the circuit element as an integral unit in which the switch renders the semiconductor device inoperative when the semiconductor device temperature exceeds a certain level.

Another object of this invention is to provide a self-protective circuit element that includes a semiconductor device and a self-resetting current responsive switch in a casing that presents the circuit element as an integral unit in which the switch renders the semiconductor device inoperative when the current therethrough exceeds a predetermined level.

It is another object of this invention to provide a self-protective circuit element that includes a controlled rectifier having a gate terminal and a temperature responsive switch in series circuit with the gate terminal for preventing the turning on of the rectifier when the rectifier temperature exceeds a certain level.

Other objects and advantages will become apparent from the following specification and the attached drawings, in which.

Figure 1:
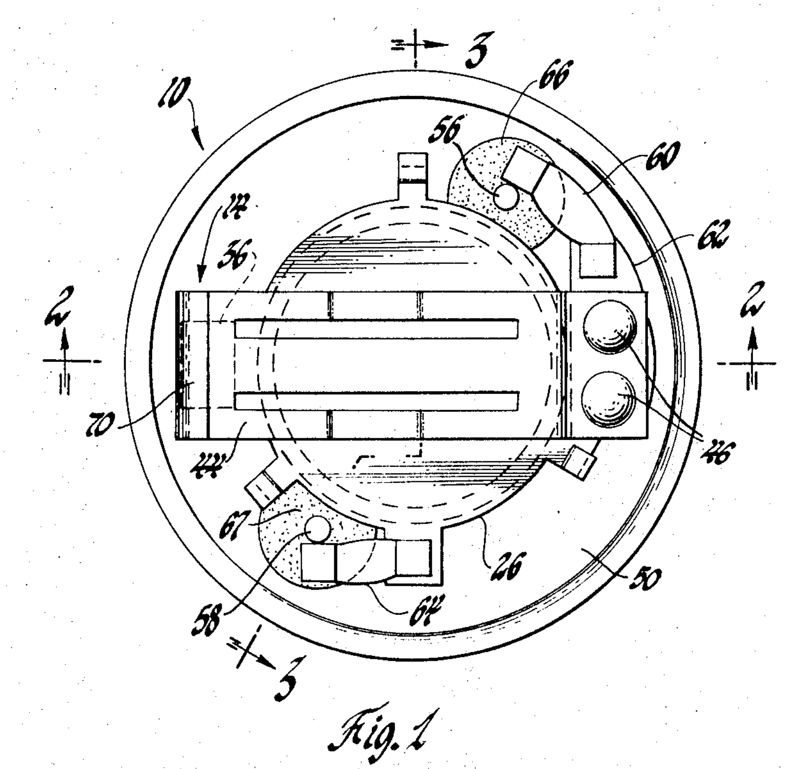
FIG. 1 is a top view of a self-protective circuit element incorporating the principles of the subject invention.
Figure 2:
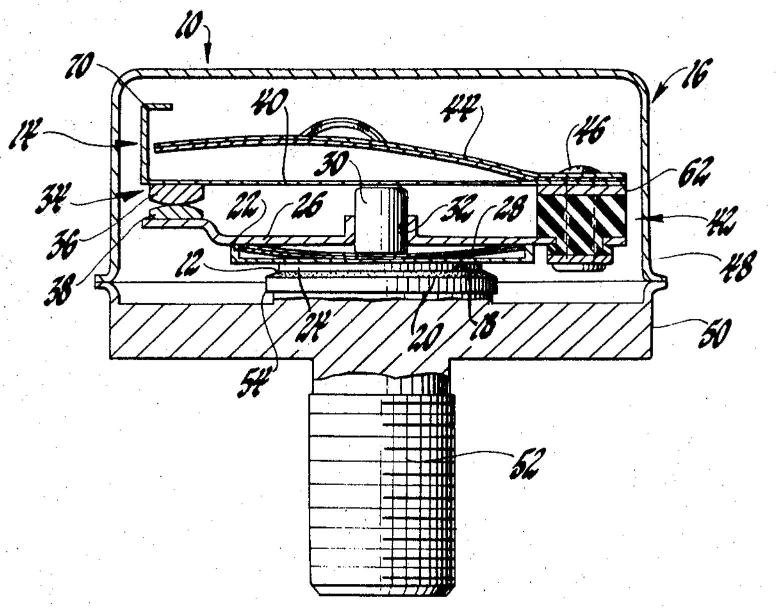
FIGS. 2 and 3 are sectional views of the circuit element presented in FIG. 1.
Figure 3:
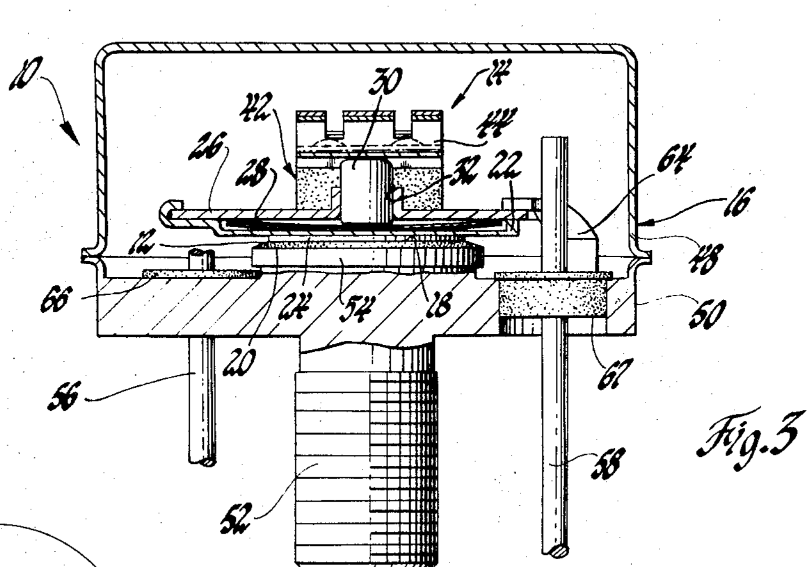

As is seen in FIGS. 1 through 3, a circuit element 10 embodying the principles of the subject invention is comprised of a semiconductor device 12, a temperature responsive switch 14 for sensing the temperature of the semiconductor device 12 and for controlling the semiconductor device 12 operativeness in accordance with the sensed temperature, and a casing 16 for enclosing the semiconductor device 12 and the switch 14 so as to present the circuit element 10 as an integral package and for providing a plurality of electrically insulated current paths to the semiconductor device 12 and the switch 14 from outside the casing 16.

While the semiconductor device 12 may in practice be of several diverse types, it is presented by way of example in the illustrated embodiment as being a silicon chip in which has been formed a rectifier, such as a Zener diode, as by well-known techniques. For descriptive purposes it may be assumed that the upper surface 18 of the semiconductor device 12 is a cathode and that the lower surface 20 of the semiconductor device 12 is an anode.

The switch 14 includes a connector member 22 coupled to the semiconductor device 12 by an isolation layer 24 so as to be in heat transfer relation with, and at the same electrical potential as, the upper surface 18. It is thus apparent that the connector member 22 and the isolation layer 24 must be conductors of both heat and current. The connector member 22 in the illustrated embodiment is made of copper, which is an inexpensive material having these characteristics. The isolation layer 24 is provided to protect the semiconductor device 12 from the stresses produced by thermal expansion of the copper connector member 22 relative to the thermal expansion of the silicon semiconductor device 12. A material which has been found suitable for the isolation layer 24 is molybdenum as it has nearly the same thermal expansion coefficient as silicon and, by making the surface of the connector member 22 in contact with the isolation layer 24 very thin so as to minimize thermally produced forces, may be made thick enough to absorb these thermal expansion stresses. The stress at the upper surface 18 due to the thermal expansion of the connector member 22 is thus kept to a minimum.

Figure 4:
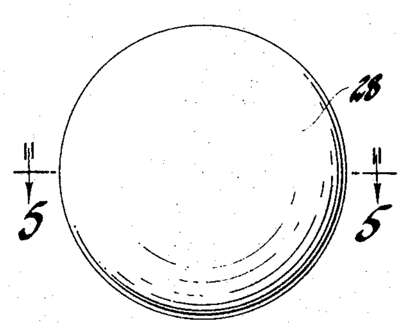
FIGS. 4 and 5 are top and sectional views, respectively, of a bimetal snap disc shown in FIGS. 1 through 3.
Figure 5:

The switch 14 also includes an apertured support member 26 for cooperating with the connector member 22 so as to define a space therebetween and a temperature responsive member in the form of a bimetal snap disc 28, shown in greater detail in FIGS. 4 and 5, for sensing the semiconductor device 12 temperature through the connector member 22 and the isolation layer 24. The bimetal disc 28 is designed so as to assume an initial position, shown in solid lines in FIG. 5, when at a temperature below a certain level and to assume a deflected position, shown in dashed lines in FIG. 5, when at a temperature above the certain level.

The switch 14 is provided with a plunger 30 positioned in an aperture 32 in the support member 26 so as to be slidably driven by the bimetal disc 28 and a contact assembly 34 for controlling the operativeness of the semiconductor device 12 in accordance with the plunger 30 position. The contact assembly 34 includes a set of contacts 36 and 38, a contact support member 40 for supporting the upper contact 36, and a spacer assembly 42 for supporting and electrically insulating the contact support member 40 from the apertured support member 26.

Figure 6:
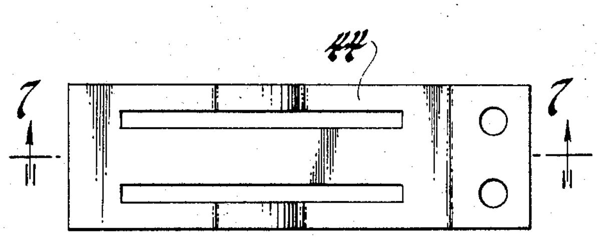
FIGS. 6 and 7 are top and sectional views, respectively, of a bimetal snap strip shown in FIGS. 1 through 3.
Figure 7:
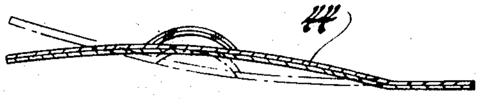
Figure 9:
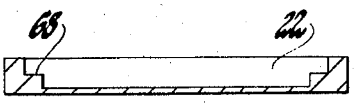
FIGS. 9 and 10 are cross-sectional views of a modification of a connector member shown in FIGS. 1 through 3.

In addition, the switch 14 also includes a second temperature responsive member in the form of a bimetal strip 44 held in heat transfer relation with the contact support member 40 by rivets 46 in the spacer assembly 42. The bimetal strip 44, shown in greater detail in FIGS. 6 and 7, is designed so as to assume an initial position, shown in solid lines in FIG. 7, when at a temperature below a certain level and to assume a deflected position, shown in dashed lines in FIG. 7, when at a temperature above the certain level. Since the bimetal strip 44 is in heat transfer relation with the contact support member 40, the heat produced in the contact support member 40 by current therethrough is sensed via conduction by the bimetal strip 44 so as to control the position assumed by the bimetal strip 44.

The casing 16 disclosed in FIGS. 1 through 3 may be of any conventional design but in the illustrated embodiment is comprised of a cover 48 and a base 50. The base 50 is provided with a stud 52 to facilitate mounting the circuit element 10 on a structure (not shown). By enclosing the semiconductor device 12 and the switch 14, the casing 16 presents the circuit element 10 as an integral device. The casing 16 in the preferred embodiment is made of an electrically conductive material having heat transfer capability, such as copper, so as to facilitate the removal of heat from the semiconductor device 12 and to provide a current path from the base 50 through a second isolation layer 54 to the lower surface 20 of the semiconductor device 12.

The isolation layer 54, hereafter referred to as the lower isolation layer 54, is similar in function to the isolation layer 24, hereafter referred to as the upper isolation layer 24. That is, it protects the semiconductor device 12 from the stresses produced by thermal expansion of the base 50. The base 50 is made considerably thicker than the surface of connector member 22 in contact with the upper isolation layer 24 to facilitate heat transfer. It thus produces more severe thermal expansion stresses than does the connector member 22. The lower isolation layer 54 is made thicker to compensate for this effect and in the preferred embodiment is made of tungsten, which has thermal characteristics similar to molybdenum but which can be more readily made into a thicker layer.

In addition to the current path made to the lower surface 20 of the semiconductor device 12 through the base 50, a pair of terminals 56 and 58 provide current paths to the respective contacts 36 and 38. As is seen in FIG. 1, the terminal 56 is electrically connected to the upper contact 36 through a wire cable 60, a conductive strap 62, and the contact support member 40. The terminal 58 is electrically connected to the lower contact 38 through a wire cable 64 and the apertured support member 26. The terminals 56 and 58 are electrically isolated from the casing 16 by a pair of insulators 66 and 67, most clearly shown in FIG. 3.

Figure 8:
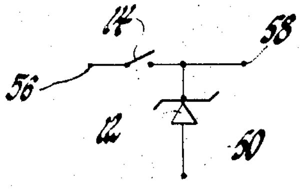
FIG. 8 is a schematic representation of the circuit element shown in FIGS. 1 through 3.
Figure 10:
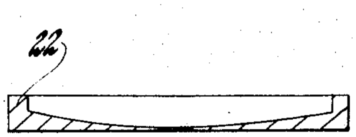

As persons skilled in the art will appreciate, the circuit element 10 may be used as three different two terminal devices or as a three terminal device. Referring to the schematic illustration of the circuit element 10 shown in FIG. 8, it is seen that by using only the terminals 56 and 58 the circuit element 10 may be used as a switch. By using the terminal 58 and the base 50 as the only connections to the circuit element 10 it may be used as a semiconductor device. Similarly, by using only the terminal 56 and the base 50 the circuit element 10 may be used as a switch in series with a semiconductor device. The circuit element 10 may be used as a three terminal device by making electrical connections to the base 50 and the terminals 56 and 58. In the illustrated embodiment where the semiconductor device 12 is a Zener diode the base 50 would normally be grounded so as to serve as a common terminal for both input and output circuits. For example, the terminal 56 may be provided with an unregulated input voltage so as to provide a regulated output voltage at the terminal 58 when the switch 14 is in its normally closed position. The switch 14 is opened automatically to protect the semiconductor device 10 from excessive currents and temperatures, as will now be explained with reference to the circuit element 10 being used in this three terminal configuration.

As current passes through the semiconductor device 12 it is heated internally. Heat produced in the semiconductor device 12 is removed by conduction through the lower isolation layer 54 and the base 50 to a heat sink (not shown). In addition, heat from the semiconductor device 12 is conducted through the upper isolation layer 24 and the connector member 22 to the bimetal disc 28. So long as the temperature sensed by the bimetal disc 28 is below a certain level the bimetal disc 28 remains in its initial position.

When the sensed temperature exceeds the certain level the bimetal disc 28 snaps, causing its center to pass through the plane defined by its perimeter and causing it to assume the deflected position shown in dashed lines in FIG. 5. As the bimetal disc snaps its perimeter comes into contact with the connector member 22 and its center portion drives the plunger 30 toward the contact support member 40, which is positioned so as to separate the upper contact 36 from the lower contact 38 in response to the motion of the plunger 30 caused by the snapping of the bimetal disc 28. The snapping of the bimetal disc 28 thus removes the energization from the semiconductor device 12 when the temperature of the semiconductor device 12 exceeds what is considered to be a safe level, permitting the semiconductor device 12 to cool.

Figure 11:
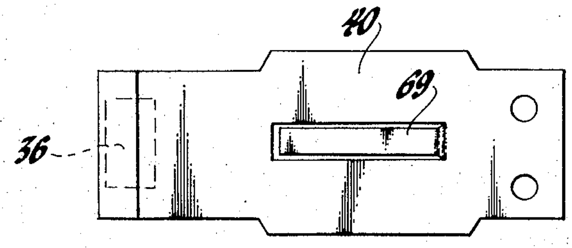
FIGS. 11 and 12 are top and sectional views, respectively, of a modification of a contact support member shown in FIGS. 1 through 3.
Figure 12:
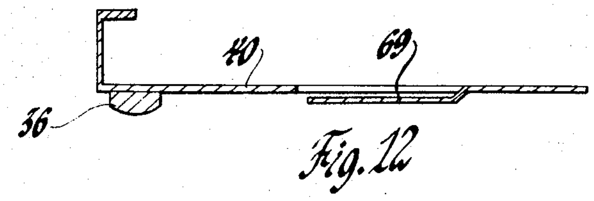

The operation of the bimetal disc 28 may be altered by the design of the connector member 22 and the contact support member 40, as seen in FIGS. 9 through 12. For example, a connector member 22 having the cross sectional configuration shown in FIG. 9 will provide the plunger 30 with an increased displacement when the bimetal disc 28 assumes the deflected position due to the perimeter of the bimetal disc 28 being supported by a circular lip 68. If the connector member 22 is made to have the cross-sectional configuration shown in FIG. 10 a larger portion of the bimetal disc 28 is in heat transfer relation with the connector member 22, increasing the sensitivity of the bimetal disc 28 to the semiconductor device 12 temperature. The contact support member 40 disclosed in FIGS. 11 and 12 is provided with a spring member 69 formed therein to depress the plunger 30 so as to assure that the bimetal disc 28 remains in contact with the connector member 22. The bimetal disc 28 will therefore sense the semiconductor device 12 temperature regardless of whether the circuit element 10 is in the upright position shown in FIGS. 1 through 3.

When the bimetal disc 28 is in the deflected position it senses very little of the semiconductor device 12 temperature as only its perimeter is in contact with the connector member 22. The bimetal disc 28 will thus remain in the deflected position so long as its temperature is above the certain level and will then assume the initial position again. When the bimetal disc 28 reassumes the initial position the contacts 36 and 38 are closed so as to reenergize the semiconductor device 12. If the semiconductor device 12 has cooled to a temperature below the certain level the bimetal disc 28 will remain in its initial position. If not, the bimetal disc 28 will snap to its deflected position again so as to again remove the semiconductor device 12 energization permitting its temperature to decrease below a safe level.

As a practical matter, the bimetal disc 28 performance has a hysteresis. That is, it begins to creep from the initial position to the deflected position at temperatures just below the certain temperature then snaps at the certain temperature. Similarly, it begins to creep from the deflected position to the initial position at temperatures near the certain temperature. While this hysteresis effect is unnecessary it is useful as it provides a time delay to allow for dissipation of heat from the semiconductor device 12 through the base 50. As is apparent to those versed in the art, the snap disc 28 will oscillate between the initial and the deflected positions so long as the semiconductor device 12 temperature is above the certain level and the characteristics of the snap disc 28 merely affect the frequency of oscillation and the response of the snap disc 28 to the semiconductor device 12 temperature.

The protection of the semiconductor device 12 from excessive currents will now be explained. As is seen in FIGS. 11 and 12, the contact support member 40 may be designed to have a specific cross-sectional area having a predetermined resistance to current. As is true in every device having current therethrough, power is dissipated in the contact support member 40 and the dissipated power causes the contact support member 40 to increase in temperature, heating the bimetal strip 44 by conductive heat transfer. The temperature of the bimetal strip 44 is thus controlled by controlling the cross-sectional area of the contact support member 40. While the bimetal strip 44 is designed to snap from the initial position shown in solid lines in FIG. 7 to the deflected position shown in dashed lines in FIG. 7 at a certain temperature, its temperature is a function of the current through the contact support member 40. The bimetal strip 44 is thus designed to snap at a temperature which is proportional to a predetermined current through the contact support member 40. While the snapping of the bimetal strip 44 is also affected by the ambient temperature of the circuit element 10 the effect of the ambient temperature may be disregarded for two reasons, the first being that the effect of the ambient temperature is relatively small compared with the internal heating of the contact support member 40 and the second being that the semiconductor device 12 can withstand a greater current at low temperatures than at high temperatures, its current rating being established merely to protect it from excessive currents at normal ambient temperatures.

When the bimetal strip 44 snaps from the initial position to the deflected position it encounters an end portion 70 of the contact support member 40, lifting the contact support member 40 so as to separate the contacts 36 and 38. As was described in connection with the bimetal disc 28, the bimetal strip 44 keeps the contacts 36 and 38 separated until its temperature drops sufficiently to permit it to snap back to the initial position. If the current in the contact support member again heats the bimetal strip 44 above the certain temperature it will open the contacts 36 and 38 again and this oscillation will continue until the current is below the predetermined level. The semiconductor device 12 can thus be protected against excessive currents when it is energized through the contacts 36 and 38.

Figure 13:
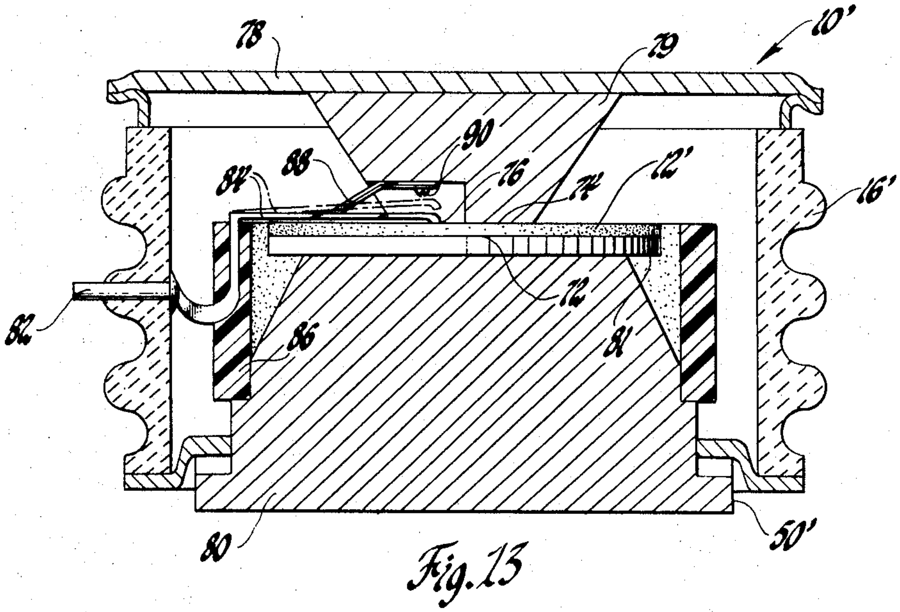
FIG. 13 is a cross-sectional view of a controlled rectifier incorporating the principles of the subject invention.
Figure 14:
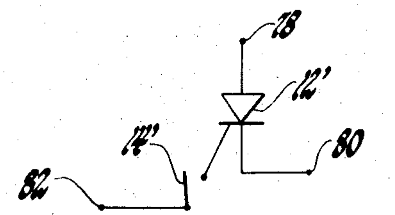
FIG. 14 is a schematic representation of the circuit element shown in FIG. 13.

In the embodiment presented in FIGS. 13 and 14 there is shown a circuit element 10′ which includes a semi-conductive device 12′ in the form of a silicon-controlled rectifier having anode 72, cathode 74, and gate 76 terminals. The casing 16′ employed in this embodiment is made of a ceramic and copper and has a copper upper surface 78 that provides a current path to the cathode 74 through a copper connector member 79 and a copper lower surface 80 which provides a current path to the anode 72. An isolation layer 81 of tungsten is provided to protect the semiconductor device 12′ from thermal stresses caused by the copper base 50′ as previously described with respect to the earlier embodiment. An exterior terminal 82 provides for electrical connection to the gate 76 through a spring contact 84. An annular supporting ring 86, formed of a nonconductor such as plastic, supports the spring contact 84. A bimetal strip 88 is affixed to the connector member 79, as by a screw 90, so as to maintain contact between the spring contact 84 and the gate 76 when in an initial position, shown in solid lines, and to release the spring contact 84 when heated so as to permit separation of the spring contact 84 from the gate 76 when in a deflected position, shown in dashed lines. The tension in the bimetal strip 88 serves to hold the spring contact 84 tightly against the gate terminal 76. As is best seen in FIG. 14, the circuit element 10′ is thus provided with a set of contacts in series with the gate 76 terminal.

Since the bimetal strip 88 is in heat transfer relation with the semiconductor device 12′ through a portion of the connector member 79 it senses the semiconductor device 12′ temperature and opens the circuit to the gate 76 when the sensed temperature exceeds a certain level. The operation of the bimetal strip 88 is identical to that of the bimetal disc 28 and the bimetal strip 44 previously described. While it is recognized that a conducting SCR will remain conducting until its power is removed, removing the gate 76 energization will preclude subsequent energization of the SCR, thereby protecting the SCR when the SCR is supplied with an alternating current, as when it is being used for rectification.

As persons skilled in the art will appreciate, the aforementioned embodiments of the subject invention are illustrative only and modifications of these embodiments may be made without departing from the spirit of the invention.

We claim:

1. A self-protective circuit element comprising, in combination, a semiconductor device and a temperature responsive switch for controlling the semiconductor operativeness, the switch including a first temperature responsive member in heat transfer relation with the semiconductor device for sensing the semiconductor device temperature, the first temperature responsive member assuming an initial position when the sensed temperature is below a certain level and assuming a deflected position when the sensed temperature is above the certain level; a contact assembly for controlling the semiconductor device operativeness, the contact assembly including a set of contacts in series circuit with the semiconductor device and positioned for separation by the first temperature responsive member so as to be closed when the first temperature responsive member is in the initial position and open when the first temperature responsive member is in the deflected position, thereby rendering the semiconductor device inoperative whenever the sensed temperature is above the certain level and operative whenever the sensed temperature is below the certain level, and 2. A circuit element comprising, in combination, a casing, a semiconductor device mounted within the casing, a normally closed switch mounted within the casing, at least first and second conductive terminal means for connection of external leads to the circuit element, the semiconductor device and the switch being series connected between the terminal means, temperature responsive means for sensing the temperature of the semiconductor device, heat transfer means defining a space in which the temperature responsive means is positioned for conductively transferring heat from the semiconductor device to the temperature responsive means, and means coupling the temperature responsive means to the switch for effecting both opening of the switch in response to heating of the semiconductor device above a predetermined value so that the switch is opened in response to overheating of the semiconductor device and closing of the switch in response to cooling of the semiconductor device below a certain temperature.

3. A power semiconductor unit comprising in combination: a semiconductor unit defining a pair of spaced surfaces between which current flows in semiconductor action and thereby generates a temperature rise which damages the semiconductor if excessive; a first electrode in face to face contact with one of said surfaces so as to define a path for current flow and heat flow; a second electrode in face to face contact with the other of said surfaces so as to define a path for current flow and heat flow, said second electrode defining a cavity adjacent the electrode and partaking of the temperature thereof; means mechanically responsive to temperature disposed in said cavity and effective to move from a unit operating position to a unit disabling position when the temperature in the cavity exceeds the value associated with said first mentioned temperature rise; and elements responsive to said means in said second position effective to interrupt current flow between said surfaces.

4. A self-protective circuit element comprising, in combination, a semiconductor device, a normally closed switch in series circuit with the semiconductor device, temperature responsive means for sensing the temperature of the semiconductor device, heat transfer means defining a space in which the temperature responsive means is positioned for conductively transferring heat from the semiconductor device to the temperature responsive means, current responsive means for sensing the current through the switch, means coupling the temperature responsive means to the switch effective both to open the switch in response to heating of the semiconductor device above a predetermined temperature, thereby protecting the semiconductor device from excessive temperatures, and to close the switch in response to cooling of the semiconductor device below a certain operating temperature, means coupling the current responsive means to the switch effective both to open the switch when the current through the switch exceeds a certain level, thereby protecting the semiconductor device from excessive currents, and close the switch after a certain time has elapsed subsequent the opening of the switch, a casing for housing the semiconductor device and the switch so as to present the circuit element as an integral unit, and a plurality of electrically insulated conductive terminals for providing a plurality of electrically insulated current paths to the semiconductor device and the switch from outside the casing.

5. A power semiconductor unit comprising in combination: a semiconductor device through which current flows in semiconductor action, causing self heating of the semiconductor device to a temperature which damages the semiconductor device if excessive, a cavity defining heat transfer member in conductive heat transfer relation with the semiconductor device for transferring heat from the semiconductor device, a normally closed set of contacts in series circuit with the semiconductor device, means mechanically responsive to temperature positioned in the cavity so as to sense the semiconductor temperature through the heat transfer member and effective to open the contacts when the sensed temperature is excessive, the mechanically responsive means effecting closure of the switch after the semiconductor device has cooled below a certain temperature, means for sensing current through the contacts, means coupling the current sensing means to the contacts effective both to open the contacts when the sensed current exceeds a predetermined value, and to close the contacts at a certain time after the contacts are opened and a casing including a plurality of terminals for enclosing the semiconductor device and contacts and for providing a plurality of electrically insulated current paths to the contacts and the semiconductor device.

6. A self-protective circuit element comprising, in combination, a controlled rectifier having a gate terminal, switch means in series circuit with the gate terminal for controlling the gate terminal operation in accordance with the rectifier temperature so as to open the gate terminal when the rectifier temperature exceeds a certain level and close the gate terminal when the rectifier temperature is below the certain level, the switch means including temperature responsive means for sensing the rectifier temperature, heat transfer means for conductively transferring heat from the rectifier to the temperature responsive means so as to facilitate the sensing of the rectifier temperature by the temperature responsive means and means for opening and closing the gate terminal in accordance with the sensed rectifier temperature, and a casing for enclosing the rectifier and the switch means so as to present the circuit element as an integral unit, the casing including a plurality of electrically insulated conductive terminals for providing a plurality of electrically insulated current paths to the rectifier and the switch means from outside the casing.

PO-1050
(5/69)

UNITED STATES PATENT OFFICE
CERTIFICATE OF CORRECTION

Patent No. 3,575,645 Dated April 20, 1971

Inventor(s) Kenneth W. Doversberger, Thomas J. Furnival

It is certified that error appears in the above-identified patent and that said Letters Patent are hereby corrected as shown below:

Column 6, line 26, insert the remainder of Claim 1.

a contact support member for supporting at least one of the contacts in series circuit with the contacts and the semiconductor device, the contact support member having a predetermined resistance for internally heating the contact support member by current therethrough, causing the contact support member temperature to be a function of the current therethrou a second temperature responsive member in heat transfer relat with the contact support member so as to sense the contact support member temperature, the second temperature responsive member assuming an initial position when the sensed temperatu of the contact support member is below a certain level and assuming a deflected position when the sensed temperature of the contact support member is above the certain level, the certain level being proportional to a predetermined current level in the semiconductor device, and engagement means for mechanically coupling the second temperature responsive membe to the contact support member whereby the contact support member is positioned in accordance with the second temperatur responsive member position so as to open the contacts when th second temperature responsive member assumes the deflected position and close the contacts when the second temperature responsive member assumes the initial position, thereby openi and closing the contacts in accordance with the current throu the contact support member so as to render the semiconductor device inoperative whenever the predetermined current passes through the contact support member.

Signed and sealed this 14th day of December 1971.

(SEAL)
Attest:

EDWARD M.FLETCHER,JR.
Attesting Officer

ROBERT GOTTSCHALK
Acting Commissioner of Patents